United States Patent
Melcher et al.

(10) Patent No.: US 8,533,616 B2
(45) Date of Patent: Sep. 10, 2013

(54) TIME SUPPORT FOR SERVICE ADAPTATION

(75) Inventors: Tobias Melcher, Dielheim (DE);
Thomas G. Houghton-Larsen, Walldorf (DE)

(73) Assignee: SAP AG, Walldorf (DE)

( * ) Notice: Subject to any disclaimer, the term of this patent is extended or adjusted under 35 U.S.C. 154(b) by 1752 days.

(21) Appl. No.: 11/322,616

(22) Filed: Dec. 30, 2005

(65) Prior Publication Data
US 2007/0153706 A1    Jul. 5, 2007

(51) Int. Cl.
*G06F 3/048*    (2013.01)

(52) U.S. Cl.
USPC .......................................... 715/763; 715/762

(58) Field of Classification Search
USPC .................................. 715/762, 763
See application file for complete search history.

(56) References Cited

U.S. PATENT DOCUMENTS

| | | | | |
|---|---|---|---|---|
| 5,301,336 | A * | 4/1994 | Kodosky et al. | 715/846 |
| 5,481,741 | A * | 1/1996 | McKaskle et al. | 345/522 |
| 5,971,581 | A * | 10/1999 | Gretta et al. | 700/83 |
| 6,437,805 | B1 * | 8/2002 | Sojoodi et al. | 715/763 |
| 7,921,408 | B2 * | 4/2011 | Shenfield et al. | 717/107 |
| 8,132,149 | B2 * | 3/2012 | Shenfield et al. | 717/107 |
| 8,296,665 | B2 * | 10/2012 | Stienhans et al. | 715/763 |
| 8,312,382 | B2 * | 11/2012 | Gilboa et al. | 715/763 |

\* cited by examiner

*Primary Examiner* — Alvin Tan
(74) *Attorney, Agent, or Firm* — Mintz Levin Cohn Ferris Glovsky and Popeo, P.C.

(57) ABSTRACT

A computer-implemented method and computer program product for adapting enterprise services to specific requirements of an enterprise. A graphical representation of a plurality of service elements is generated on a computer. Each service element includes an input and an output. A link is generated between an output of a first service element of the plurality of service elements and an input of a second service element of the plurality of service elements. The first and second service elements are concatenated via the link to form an adapted service element.

17 Claims, 4 Drawing Sheets

TIME SUPPORT FOR SERVICE ADAPTATION

BACKGROUND

An Enterprise Services Architecture (ESA) is a blueprint for a service-based, enterprise-scale business applications solution, which that offers increased levels of adaptability, flexibility, and openness required to reduce total cost of ownership. ESA combines the legacy of the best experience in enterprise applications with the flexibility of Web services and other open standards. In a present example, the NetWeaver platform developed by SAP of Walldorf Germany is a technical foundation for an Enterprise Services Architecture.

ESA elevates the design, composition, and deployment of Web services to an enterprise level to address business requirements. An enterprise service is typically a series of Web services combined with simple business logic that can be accessed and used repeatedly to support a particular business process. Aggregating Web services into business-level enterprise services provides more meaningful building blocks for the task of automating enterprise-scale business scenarios.

Enterprise services provides a platform in which to efficiently develop composite applications, which are applications that compose functionality and information from existing systems to support new business processes or scenarios. All enterprise services communicate using Web services standards, can be described in a central repository, and are created and managed by tools provided by an ESA platform. With an ESA platform, companies have a cost-effective blueprint for composing innovative new applications by extending existing systems, while maintaining a level of flexibility that makes future process changes cost-effective.

The goal of ESA notwithstanding, present ESA tools lack intuitive mechanisms to adapt basic services to particular customer needs. In particular, what is needed is a design time support tool for customer-specific adaptation of business process services and applications.

SUMMARY

This document describes a computer-implemented method and computer program product for adapting enterprise services to specific needs or requirements of an enterprise customer. In accordance with one aspect, a method includes generating a graphical representation of a plurality of service elements. Each service element including an input and an output. The method further includes generating a link between an output of a first service element of the plurality of service elements and an input of a second service element of the plurality of service elements. The method further includes concatenating the first and second service elements via the link to form an adapted service element.

In accordance with another aspect, a method includes generating a graphical representation of a plurality of service elements, and linking the output of a first service element of the plurality of service elements to the input of a second service element of the plurality of service elements. The method further includes forming an adapted service element from the linked first and second service elements.

In accordance with yet another aspect, a computer program product, tangibly embodied in an information carrier, is operable to cause a data processing apparatus to generate a graphical representation of a plurality of service elements, link the output of a first service element of the plurality of service elements to the input of a second service element of the plurality of service elements, and form an adapted service element from the linked first and second service elements.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document describes design time support for service adaptation, i.e. to adapt services of a design time application to specific customer needs. In preferred embodiments, a visual modeling tool is used. A visual modeling tool, such as the Visual Composer developed by SAP of Walldorf Germany, provides a design time environment which allows a user to configure a pattern based application in a graphical manner.

Figure 1:
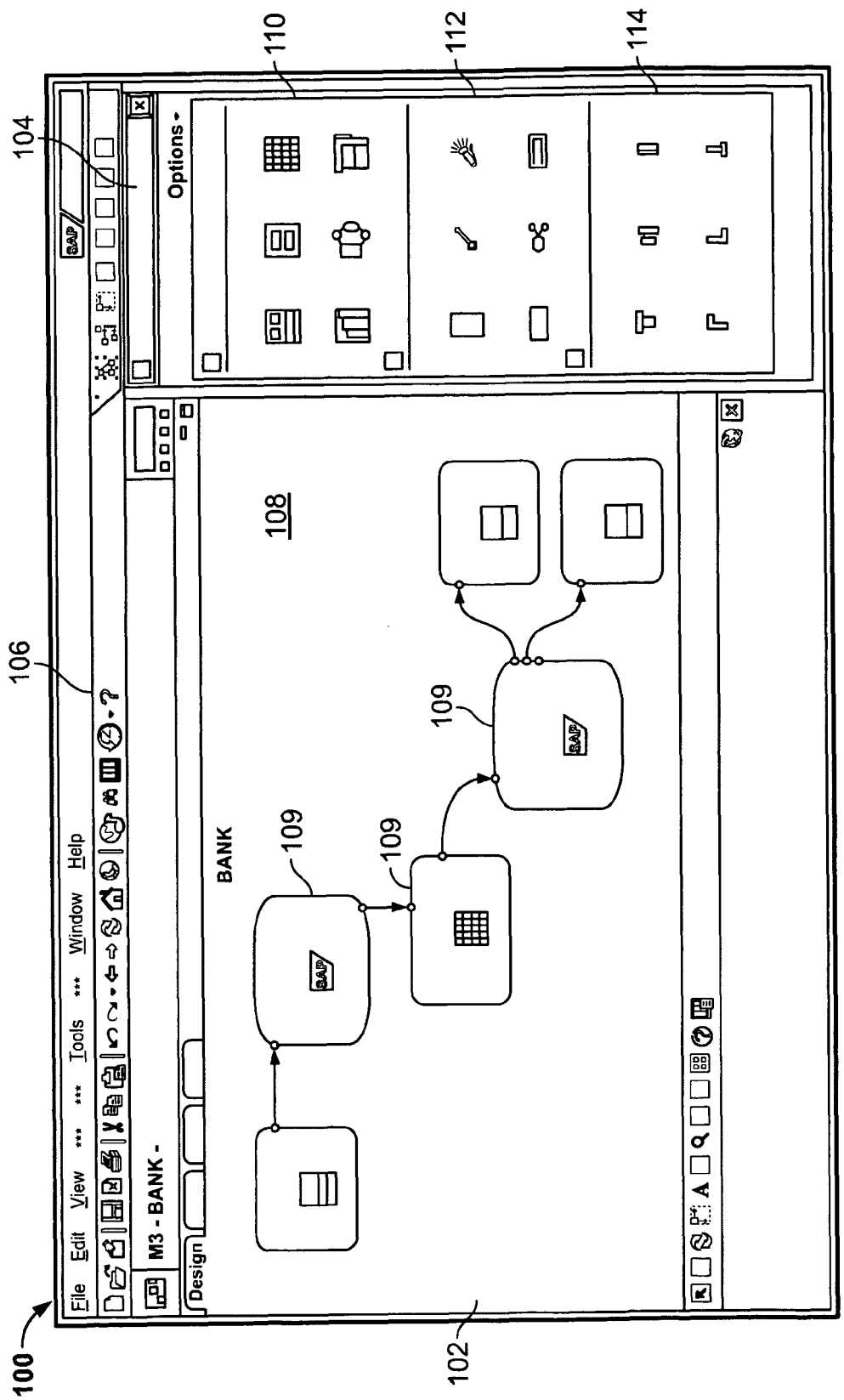
FIG. 1 is a screen shot of a visual modeling tool for design time creation of composite applications.

FIG. 1 is a screen shot of a visual modeling tool 100 for code-free creation of composite applications. The visual modeling tool 100 is platform-independent, as well as independent of any technology or programming language. The visual modeling tool 100 is preferably a web-based, rich-client presentation layer application in a client/server computer architecture. The visual modeling tool 100 includes a visual representation window 102, also known as a "storyboard," a palette 104 of selectable logic elements, and at least one control interface 106 such as a control or command bar. The visual representation window 102 displays a graphical representation of an application 108, or portion thereof.

The application 108 includes application logic and process flows as represented by a number of application objects 109. Each application object 109 can represent a functional step in a logical process or a data flow, and include one or more inputs and one or more outputs. Each application object 109 acts as a model for the execution, testing, simulation, debugging and document creation related to the application 108. A view of the visual modeling tool 100 can be configured to show only a high-level functional view of the application 108 and hide the details, however the view can be adjusted, particularly within each application object 109, so that increasing levels of detail can be viewed in the visual representation window 102.

The selectable logic elements displayed in the palette 104 can include interactors 110 that modify the view of the visual representation window 102, flow control objects 112 that provide a directive of data flow, and data operators 114 that define an operation to be executed on data within each application object 109. The selectable logic elements can be "dragged" from the palette and "dropped" into the visual representation window 102. The visual modeling tool 100 can also include property editors, design assistants, drawing tools, an interaction manager, and a code generator that generates code based on the high-level functional view of the application 108.

The application 108 can be formed, or composed, by establishing relationships between the application objects 109, and to generate a graphical representation of the application 108. The visual modeling tool 100 provides modifiability (composition, decomposition, and recomposition) of an application 108 through visual programming. The composition capabilities of the visual modeling tool 100 are an integral part of the modeling process, and are based on a component concept which is shared with the runtime environment. The elements of a composition are defined by pattern modules.

The graphical representation of the application 108 can lead to automatic code generation in a runtime environment. Once modeled in the storyboard, an application 108 can be run everywhere irrespective of platform or programming language. Variations can be made to a modeled application 108, while usability and portability is preserved. Changes to the model can be recomputed by the visual modeling tool 100, and propagated to as many versions of an application 108 as desired. In an exemplary embodiment, a composed application is associated with a unique uniform resource locator (URL) that can be accessed by any client computer using any browser, for runtime execution of the application 108.

A visual modeling tool such as Visual Composer uses a special kind of language, referred to as a Composition Language, that defines which graphical elements exist and how those graphical elements can be linked together. The Composition Language is made up of actors, plugs and links.

Actors are the units or entities of user interaction, data requests and data transformations. Plugs are associated with actors, and define the structure of the incoming data (in-plugs, or "inports") and the outgoing data (out-plugs, or "outports"). Actors can have many in-plugs and many out-plugs, which are defined by the actor itself. Links are the connectors between the plugs. A link connects an in-plug of one actor with an out-plug of another actor, or vice versa. Connections between in-plugs are not allowed; the same is true for out-plugs.

Figure 2:
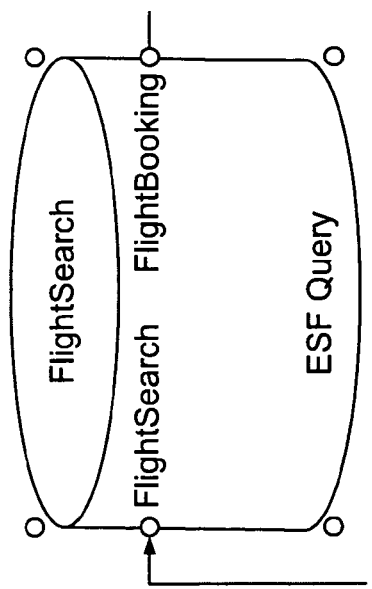
FIG. 2 illustrates a representation of a service in a visual modeling tool display.

The Composition Language also provides the concept of a token, which flows along the links and through the actor entities of an application. A token can contain data, and the data flows over a data link. Data transformation can be realized via a service element. A service element has an inport which represents a data structure. The service element makes calls, such as a request against a backend server for example, and gets a result which will be available in its outport. Query and Association (Q&A) services provided by an ESA Infrastructure (ESI) are visualized in a visual modeling tool via such service elements, as illustrated in FIG. 2. The inport represents the Query Input parameter structure or Association business object (BO) Node. The outport represents the Result BO Node.

In accordance with embodiments, a Service Adaptation functionality adapts services to customer needs in several ways:

Q Adapted Operations (Query, Association): defines a new adapted operation which executes a sequence of existing operations. The result of the adapted operation can be a regular or an adapted BO Node.

Adapted BO Node: Joins the data structure of a BO Node (primary BO Node) with the data structure of other BO Nodes (secondary BO Nodes) which can be reached via a zero-to-one association from the primary BO Node (this association could be an adapted association). This join of data structures defines a new BO Node (an adapted BO Node). It is possible to navigate via an Association service from a primary BO Node to a newly created adapted BO Node, and the adapted BO Node inherits all existing associations from primary BO Node.

Service Adaptation in a visual modeling tool allows creating adapted services in a user-friendly and understandable way. In an exemplary embodiment, graphical service elements used by the visual modeling tool can be linked together in a sequence. Several options are available to adapt services.

Figure 3:
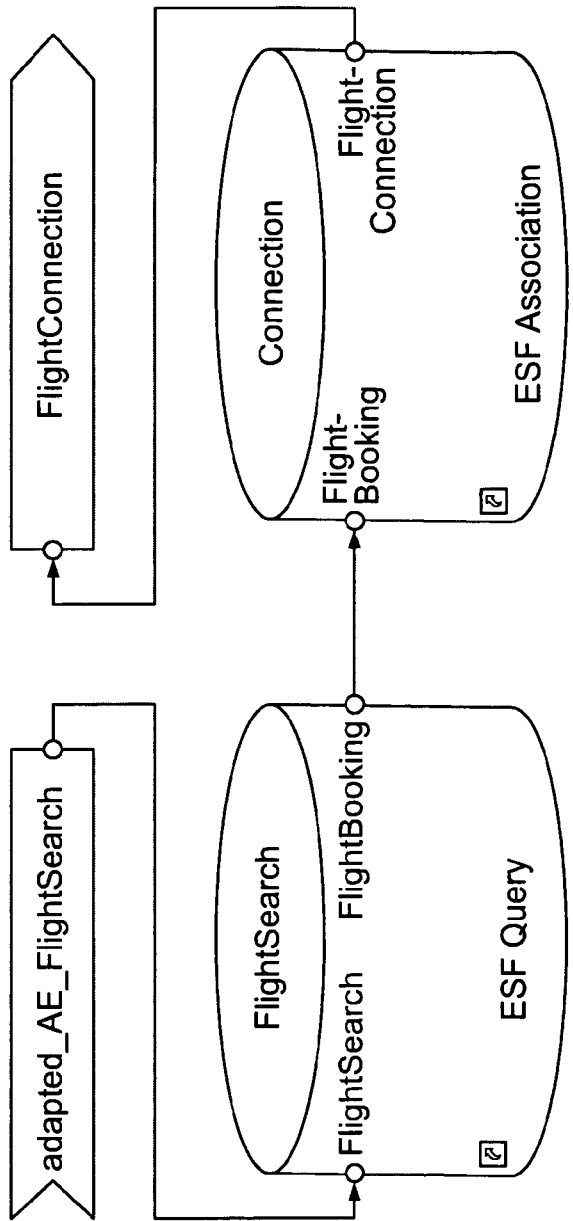
FIG. 3 illustrates concatenation of a graphical service element.

A first option is called Adapted Operations, in which several service elements are concatenated via a link created between each service. FIG. 3 represents an exemplary adapted query where a query "FlightSearch" is executed, and then an association "Connection" is executed having an input which is the result (output) of the query. The result of the adapted query is the result BO Node of the last association. In general, the source of a service element in such a concatenation must match the target of the previous element. For instance, in the example shown in FIG. 3 FlightBooking is the target of query service FlightSearch and the source of association service Connection. Any number of association services can be called after a query service. When the first service is an association (and not a query as shown in FIG. 3), an adapted association is generated, much the same as described above.

Figure 4:
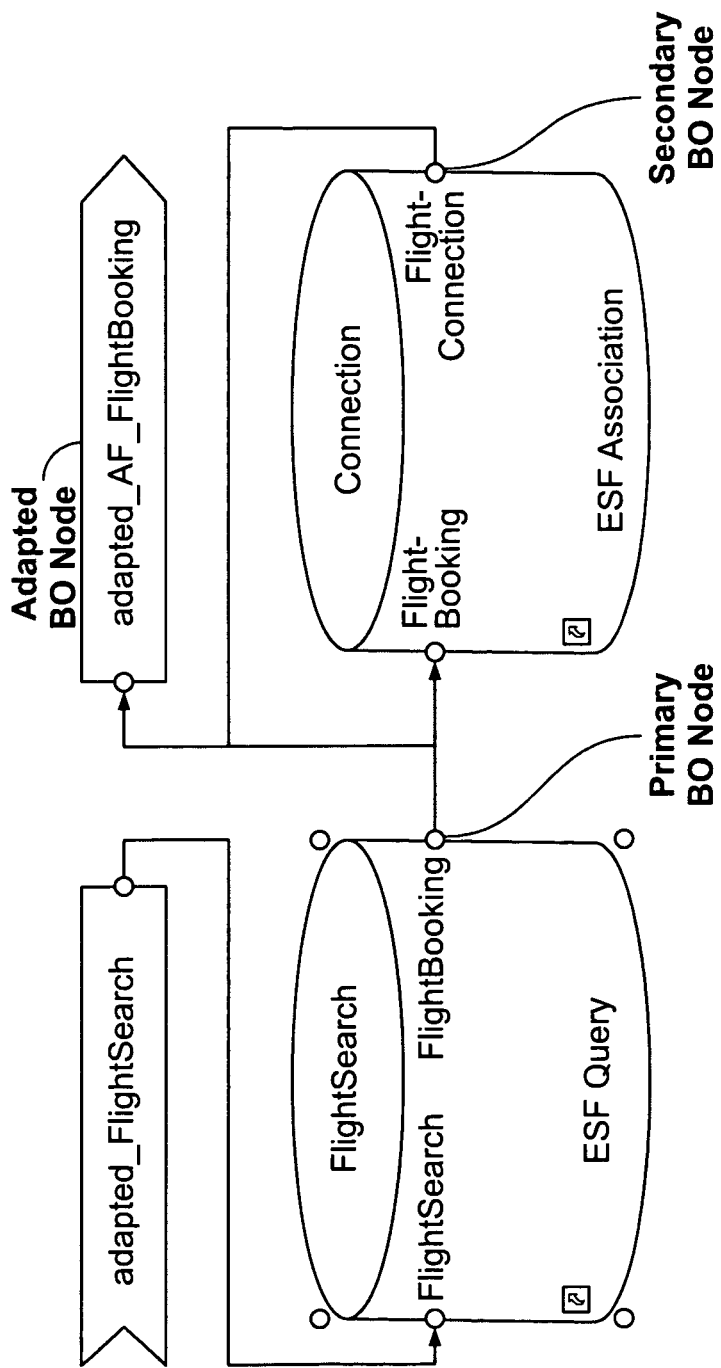
FIG. 4 shows an alternative example of service adaptation.
Figure 5:
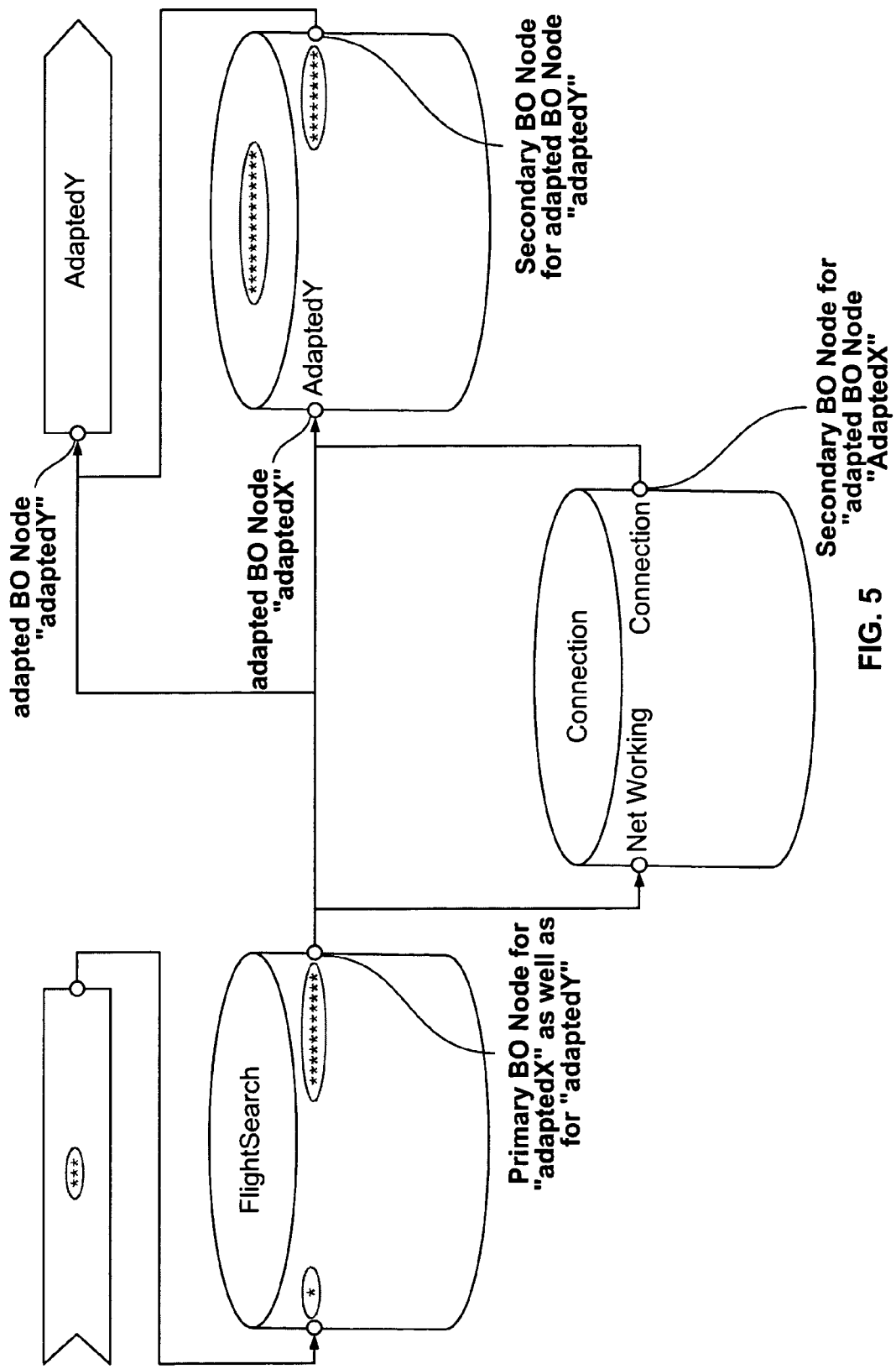
FIG. 5 shows yet another example of a service adaptation process.

Another option is called an Adapted BO Node, in which several service elements are concatenated via creating links between services where at least two links from several services are pointing to the same inport of a service or outport. FIG. 4 illustrates an exemplary adapted query, where first a query "FlightSearch" is executed. Next, a join operation is realized by linking the query service outport directly to the overall outport of the graphic representation of the service. Additionally an association "Connection" is executed where some or all result fields from this association are joined with the query result. FIG. 5 shows an example where an adapted BO Node (adaptedY) is made up of parts which are themselves adapted (adaptedX).

An adapted query or an adapted association may be represented by a query or association service element, respectively. The service element allows a drill-down, in which the structure of the adapted service is displayed as shown in FIGS. 2-5. Since these "adapted service elements" may be used or reused as any service element, even as a non-adapted service element, carrying out adaptation can result in a tree of any depth where the leaves are made up only of service elements that do not allow a drill-down, i.e. service elements which are not adapted.

Embodiments of the invention and all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

The invention claimed is:

1. A computer-implemented method for adapting enterprise services to an enterprise, the method comprising:
   generating a graphical representation of a plurality of service elements, each service element including an input and an output, each service element providing a service to an enterprise;
   generating a link between an output of a first service element of the plurality of service elements and an input of a second service element of the plurality of service elements, the first service element providing a query service to the enterprise, the second service element providing a first association service for the query service, the first association service being used by the query service to determine one or more results in response to a query in accordance with specified one or more requirements of the enterprise;

concatenating the first and second service elements via the link to form an adapted service element; and generating a primary business object node with the output of the first service element, wherein the query service is a flight search service, the first association service being a flight connection service, the one or more results of the query being a booking of a flight searched using the flight search service, the booking using one or more results of the flight connection service when a flight connection is available between a specified departure and a specified destination.

2. A method in accordance with claim 1, further comprising combining the primary business object node with an output of the second service element to form an adapted business object node.

3. A method in accordance with claim 1, further comprising:

generating a second link between an output of the second service element and an input of a third service element, the third service element providing a second association service for the second service element, the second association service being further used by the query service to determine the one or more results in response to the query in accordance with the specified one or more requirements of the enterprise.

4. A method in accordance with claim 3, further comprising:

concatenating the second and third service elements via the second link to create a second adapted service element.

5. A method in accordance with claim 3, further comprising:

concatenating the first, second and third service elements via the link and the second link to create a second adapted service element.

6. A computer-implemented method for adapting enterprise services to an enterprise, the method comprising:

generating a graphical representation of a plurality of service elements, each service element including an input and an output, the output comprising a service;

linking an output of a first service element of the plurality of service elements to an input of a second service element of the plurality of service elements, the first service element providing a query service to the enterprise, the second service element providing a first association service for the query service, the first association service being used by the query service to determine one or more results in response to a query in accordance with specified one or more requirements of the enterprise;

forming an adapted service element from the linked first and second service elements; and generating a primary business object node with the output of the first service element, wherein the query service is a flight search service, the first association service being a flight connection service, the one or more results of the query being a booking of a flight searched using the flight search service, the booking using one or more results of the flight connection service when a flight connection is available between a specified departure and a specified destination.

7. A method in accordance with claim 6, further comprising forming an adapted business object node from the primary business object node and an output of the second service element.

8. A method in accordance with claim 6, further comprising linking an output of the second service element with an input of a third service element, the third service element providing a second association service for the second service element, the second association service being used by the first association service to determine one or more results produced by the first association service that are further used to determine the one or more results in response to the query in accordance with the specified one or more requirements of the enterprise.

9. A method in accordance with claim 8, further comprising forming a second adapted service element from the linked second and third service elements.

10. A method in accordance with claim 9, further comprising generating a secondary business object node with an output of the third service element.

11. A method in accordance with claim 10, further comprising forming a second adapted business object node from the primary business object node and the output of the third service element.

12. A non-transitory computer-readable medium containing instructions to cause a processor to perform operations comprising:

generating a graphical representation of a plurality of service elements, each service element including an input and an output, each service element providing a service to an enterprise;

linking an output of a first service element of the plurality of service elements to an input of a second service element of the plurality of service elements, the first service element providing a query service to the enterprise, the second service element providing a first association service for the query service, the first association service being used to determine one or more results in response to a query in accordance with specified one or more requirements of the enterprise;

forming an adapted service element from the linked first and second service elements; and generating a primary business object node with the output of the first service element, wherein the query service is a flight search service, the first association service being a flight connection service, the one or more results of the query being a booking of a flight searched using the flight search service, the booking using one or more results of the flight connection service when a flight connection is available between a specified departure and a specified destination.

13. A non-transitory computer-readable medium in accordance with claim 12, wherein the operations further comprise forming an adapted business object node from the primary business object node and an output of the second service element.

14. A non-transitory computer-readable medium in accordance with claim 12, wherein the operations further comprise linking an output of the second service element with an input of a third service element, the third service element providing a second association service for the second service element, the second association service being used to determine the one or more results in response to the query in accordance with the specified one or more requirements of the enterprise.

15. A non-transitory computer-readable medium in accordance with claim 14, wherein the operations further comprise forming a second adapted service element from the linked second and third service elements.

16. A non-transitory computer-readable medium in accordance with claim 15, wherein the operations further comprise generating a secondary business object node with an output of the third service element.

17. A non-transitory computer-readable medium in accordance with claim 16, wherein the operations further comprise forming a second adapted business object node from the primary business object node and the output of the third service element.

* * * * *